(12) United States Patent
Frankkila et al.

(10) Patent No.: US 9,454,973 B2
(45) Date of Patent: Sep. 27, 2016

(54) METHOD AND ARRANGEMENT FOR PROVIDING A BACKWARDS COMPATIBLE PAYLOAD FORMAT

(75) Inventors: Tomas Frankkila, Lulea (SE); Stefan Bruhn, Sollentuna (SE); Daniel Enstrom, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 989 days.

(21) Appl. No.: 13/262,354

(22) PCT Filed: Apr. 7, 2010

(86) PCT No.: PCT/SE2010/050381
§ 371 (c)(1),
(2), (4) Date: Sep. 30, 2011

(87) PCT Pub. No.: WO2010/117327
PCT Pub. Date: Oct. 14, 2010

(65) Prior Publication Data
US 2012/0035918 A1 Feb. 9, 2012

Related U.S. Application Data

(60) Provisional application No. 61/167,273, filed on Apr. 7, 2009.

(51) Int. Cl.
*G10L 19/24* (2013.01)
*G10L 19/16* (2013.01)
(Continued)

(52) U.S. Cl.
CPC ............ *G10L 19/24* (2013.01); *G10L 19/167* (2013.01); *H04L 65/608* (2013.01); *H04L 69/03* (2013.01);
(Continued)

(58) Field of Classification Search
CPC ... G10L 19/24; G10L 19/167; H04L 65/608; H04L 69/03; H04L 69/608; H04N 21/2381; H04N 21/4381; H04N 21/6437; H04N 21/8106; H04N 21/234327
USPC ....... 370/352, 389, 464, 466, 471, 474, 392, 370/393, 473; 704/200, 201
See application file for complete search history.

(56) References Cited

U.S. PATENT DOCUMENTS 5,550,593 A * 8/1996 Nakabayashi ................ 348/465
6,452,941 B1 * 9/2002 Bruhn .......................... 370/468

(Continued)

FOREIGN PATENT DOCUMENTS

EP 1414273 A1 4/2004

OTHER PUBLICATIONS

MacAulay, Alex et al., IP Streaming of MPEG-4: Native RTP vs MPEG-2 Transport Stream, Oct. 2005, Envivio Whitepaper, p. 3 and 9.*

(Continued)

*Primary Examiner* — Noel Beharry
*Assistant Examiner* — Rodrick Mak
(74) *Attorney, Agent, or Firm* — Rothwell, Figg, Ernst & Manbeck, P.C.

(57) ABSTRACT

In a method of providing a backward and forward compatible speech codec payload format, the following steps are included: providing S10 an RTP package; including S20 payload according to a first codec into the provided RTP package, and appending S50 payload according to a second codec into the provided RTP package. In addition, at least one unused bit is located S30 in the included first codec payload, and the located at least one unused bit is designated S40 as a codec compatibility bit. Finally, the designated at least one codec compatibility bit is utilized S60 to provide an indication of the presence of the appended second codec payload.

10 Claims, 20 Drawing Sheets

(51) Int. Cl.
*H04N 21/6437* (2011.01)
*H04L 29/06* (2006.01)
*H04N 21/2343* (2011.01)
*H04N 21/2381* (2011.01)
*H04N 21/438* (2011.01)
*H04N 21/81* (2011.01)

(52) U.S. Cl.
CPC .. *H04N 21/2381* (2013.01); *H04N 21/234327* (2013.01); *H04N 21/4381* (2013.01); *H04N 21/6437* (2013.01); *H04N 21/8106* (2013.01)

(56) References Cited

U.S. PATENT DOCUMENTS

| | | | |
|---|---|---|---|
| 6,934,756 B2* | 8/2005 | Maes | 709/227 |
| 7,154,895 B1* | 12/2006 | Bornemisza et al. | 370/395.1 |
| 7,821,953 B2* | 10/2010 | Yarlagadda et al. | 370/252 |
| 8,199,727 B1* | 6/2012 | Bienn et al. | 370/335 |
| 8,279,892 B2* | 10/2012 | Denney et al. | 370/468 |
| 8,458,753 B2* | 6/2013 | Hasek et al. | 725/86 |
| 8,644,306 B2* | 2/2014 | Kimn et al. | 370/389 |
| 8,711,842 B2* | 4/2014 | Knappe | 370/352 |
| 2004/0240446 A1* | 12/2004 | Compton | 370/389 |
| 2005/0073997 A1* | 4/2005 | Riley et al. | 370/352 |
| 2005/0075873 A1* | 4/2005 | Makinen | 704/230 |
| 2005/0094606 A1* | 5/2005 | Adrangi et al. | 370/338 |
| 2005/0195823 A1* | 9/2005 | Chen et al. | 370/395.1 |
| 2005/0232232 A1* | 10/2005 | Farber et al. | 370/352 |
| 2005/0265349 A1* | 12/2005 | Garg et al. | 370/395.2 |
| 2005/0286475 A1* | 12/2005 | Ahmavaara | 370/335 |
| 2006/0034260 A1* | 2/2006 | Svedberg et al. | 370/352 |
| 2006/0041431 A1* | 2/2006 | Maes | 704/270.1 |
| 2006/0153102 A1* | 7/2006 | Kuure | H04Q 3/0016 370/263 |
| 2006/0268845 A1* | 11/2006 | He et al. | 370/352 |
| 2007/0177015 A1* | 8/2007 | Arakawa et al. | 348/159 |
| 2009/0028182 A1* | 1/2009 | Brooks et al. | 370/466 |
| 2009/0201910 A1* | 8/2009 | Kumarasamy et al. | 370/352 |
| 2009/0285150 A1* | 11/2009 | Ravishankar et al. | 370/316 |
| 2010/0002692 A1* | 1/2010 | Bims | 370/389 |
| 2010/0120462 A1* | 5/2010 | Mammarappallil et al. | 455/518 |
| 2010/0142477 A1* | 6/2010 | Yokota | 370/331 |
| 2010/0226366 A1* | 9/2010 | Lee et al. | 370/389 |
| 2012/0213234 A1* | 8/2012 | Zhang et al. | 370/474 |

OTHER PUBLICATIONS

Sollaud, A. RTP payload format for the future scalable and wideband extension of G.729 audio codec, Mar. 21, 2005, France Telecom, Internet Draft of Network Working Group, pp. 1, 4, 6. cited from http://www.cs.columbia.edu/~hgs/rtp/drafts/draft-sollaud-avt-rtp-g729-scal-wb-ext-00.txt.*

3GPP, "3rd Generation Partnership Project; Technical Specification Group Services and System Aspects; Transparent end-to-end Packet-switched Streaming Service (PSS); Protocols and codecs (Release 8)," 3GPP TS 26.234 V8.2.0, Mar. 1, 2009, 155 pages.

Lakaniemi, et al., "RTP payload format for G.718 speech/audio," Audio/Video Transport WG, Internet Draft, Internet Engineering Task Force, Internet Society, Sep. 28, 2008, pp. 1-33.

Sjoberg, et al., "RTP Payload Format and File Storage Format for the Adaptive Multi-Rate (AMR) and Adaptive Multi-Rate Wideband (AMR-WB) Audio Codecs," Network Working Group, Request for Comments: 4867, ITEF Standard, Apr. 1, 2007, pp. 1-59.

"3rd Generation Partnership Project Technical Specification Group GERAN Support for voice optimization for the IMS in the GERAN (Release 5)", 3GPP Standard: 3GPP TR 43.900, 3rd Generation Partnership Project (3GPP), Mobile Competence Centre; 650, Route Des Lucioles; F-06921 Sophia-Antipolis Cedex; France, No. V.1.0.0, Aug. 1, 2001, pp. 1-35, XP050378347.

Supplementary European Search Report dated Oct. 2, 2013 from corresponding European application No. 10761937.1, 7 pages.

Schulzrinne, H., et al. "RTP: A Transport Protocol for Real-Time Applications", Network Working Group, Request for Comments: 3550, Obsoletes: 1889, Category: Standards Track, Jul. 2003, 104 pages.

International Telecommunication Union, "Series G: Transmission Systems and Media, Digital Systems and Networks", Digital terminal equipments—Coding of analogue signals by methods other than PCN, Coding of speech at 8 kbit/s using conjugate-structure algebraic-code-excited linear prediction (CS-ACELP), ITU-T Recommendation G.729, Jan. 2007, 146 pages.

International Telecommunication Union, "General Aspects of Digital Transmission Systems; Terminal Equipments", CCITT, Recommendation G.726, Dec. 1990, 59 pages.

International Telecommunication Union, "General Aspects of Digital Transmission Systems, Terminal Equipments", Pulse Code Modulation (PCM) of Voice Frequencies, Recommendation G.711, 1993, 12 pages.

ETSI TS 126 071, "Digital cellular telecommunications system (Phase 2+); Universal Mobile Telecommunications System (UMTS); LTE; Mandatory speech Codec speech Processing functions; AMR speech Codec; General description (3GPP TS 26.071 version 9.0.0 Release 9)", Jan. 2010, 14 pages.

ETSI TS 126 171, "Digital cellular telecommunications system (Phase 2+); Universal Mobile Telecommunications System (UMTS); LTE; Speech codec speech processing functions; Adaptive Multi-rate-Wideband (AMR-WB) speech codec; General description (3GPP TS 26.171 version 8.0.0 Release 8)", Jan. 2009, 14 pages.

* cited by examiner

Bandwidth-efficient payload format mode with 1 frame in the packet

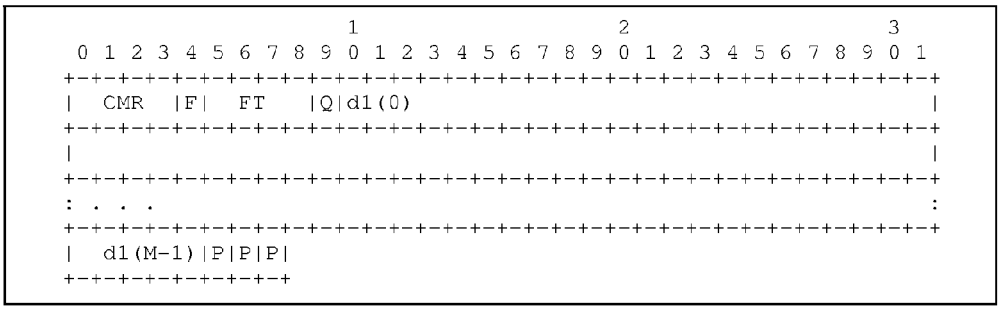

Bandwidth-efficient payload format mode with 2 frames in the packet

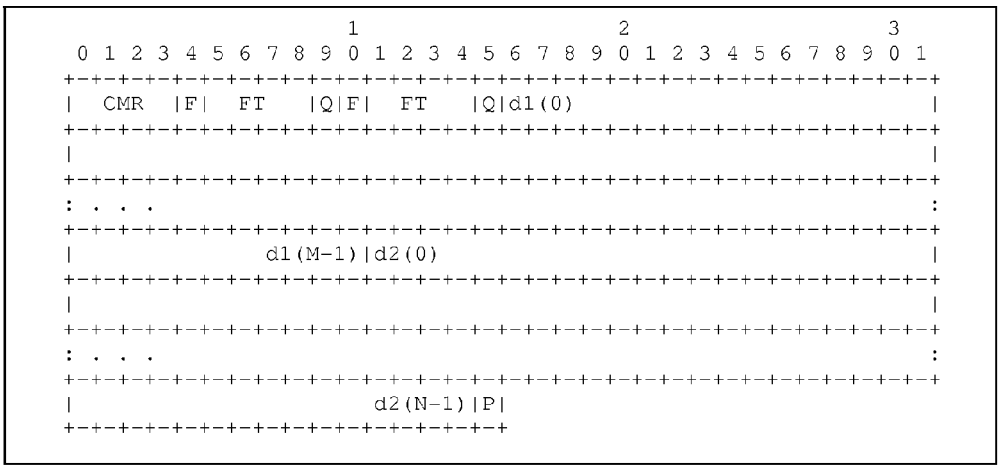

CMR     = Codec Mode Request
F        = Indicates whether the current frame is followed by another frame
FT      = Frame Type
Q       = Frame quality indicator
P       = Padding
d1(m)  = Speech data bits frame 1
d2(n)   = Speech data bits frame 2
M      = Number of speech bits for the first frame in the RTP packet
N      = Number of speech bits for the second frame in the RTP packet (if available)

Fig. 2

Octet-aligned payload format mode with 1 frame in the packet

```
                    1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   CMR     |R|R|R|R|F|    FT    |Q|P|P|d1(0)                  |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
:   . . .                                                       :
+-+-+-+-+-+-+-+-+-+-+-+-+-+-+-+-+-+-+-+-+-+-+-+-+-+-+-+-+-+-+-+-+
|               d1(M-1)|P|P|P|P|P|
+-+-+-+-+-+-+-+-+-+-+-+-+-+-+-+-+
```

Octet-aligned payload format mode with 2 frame in the packet

```
                    1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   CMR     |R|R|R|R|F|    FT    |Q|P|P|F|    FT    |Q|P|P|d1(0)|
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
:   . . .                                                       :
+-+-+-+-+-+-+-+-+-+-+-+-+-+-+-+-+-+-+-+-+-+-+-+-+-+-+-+-+-+-+-+-+
|                               d1(M-1)|P|P|P|P|P|P|d2(0)       |
+-+-+-+-+-+-+-+-+-+-+-+-+-+-+-+-+-+-+-+-+-+-+-+-+-+-+-+-+-+-+-+-+
:   . . .                                                       :
+-+-+-+-+-+-+-+-+-+-+-+-+-+-+-+-+-+-+-+-+-+-+-+-+-+-+-+-+-+-+-+-+
|                                       d2(N-1)|P|P|P|P|
+-+-+-+-+-+-+-+-+-+-+-+-+-+-+-+-+-+-+-+-+-+-+-+-+-+-+-+-+
```

| | |
|---|---|
| CMR | = Codec Mode Request |
| R | = Reserved |
| F | = Indicates whether the current frame is followed by another frame |
| FT | = Frame Type |
| Q | = Frame quality indicator |
| P | = Padding |
| d1(m) | = Speech data bits frame 1 |
| d2(n) | = Speech data bits frame 2 |
| M | = Number of speech bits for the first frame in the RTP packet |
| N | = Number of speech bits for the second frame in the RTP packet (if available) |

Fig. 3

Octet-aligned payload format mode with 1 frame in the packet and extension data

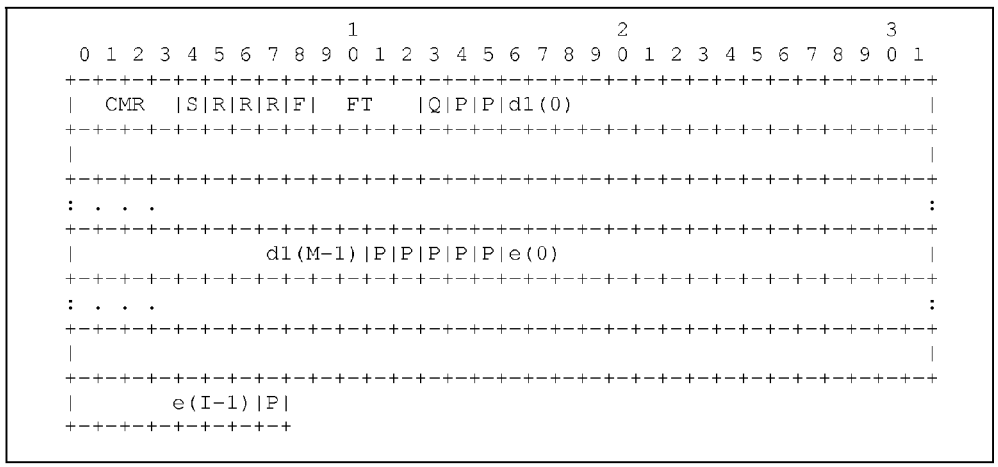

| | |
|---|---|
| CMR | = Codec Mode Request |
| S | = Signaling bit indicating that there is extension data in the payload |
| R | = Reserved |
| F | = Indicates whether the current frame is followed by another frame |
| FT | = Frame Type |
| Q | = Frame quality indicator |
| P | = Padding |
| d1(m) | = Speech data bits frame |
| M | = Number of speech data bits |
| e(i) | = Extension data bits |
| I | = Number of extension bits |

Fig. 9

RTP packet with speech data and extension data

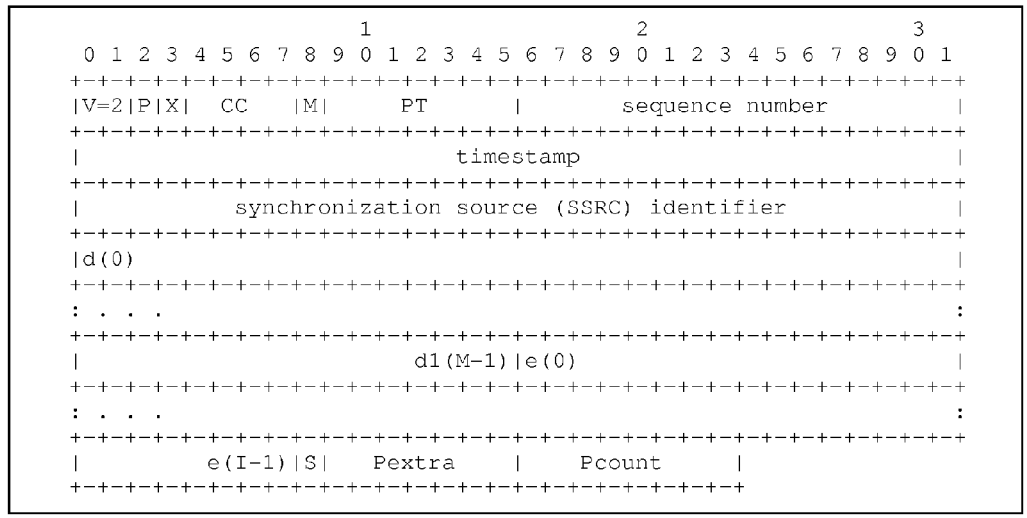

| | |
|---|---|
| P | = Padding bit flag in the RTP header, is set to 1 to indicate that there is additional padding |
| d(m) | = Speech data bits |
| M | = Number of speech bits for the first frame in the RTP packet |
| e(i) | = Extension data bits |
| I | = Number of extension bits |
| S | = Signaling bit indicating that there is extension data in the payload |
| Pextra | = Extra padding bits |
| Pcount | = Indicates the number of padding octets in the end of the payload |

Fig. 13

METHOD AND ARRANGEMENT FOR PROVIDING A BACKWARDS COMPATIBLE PAYLOAD FORMAT

CROSS REFERENCE TO RELATED APPLICATION(S)

This application is a 35 U.S.C. §371 National Phase Entry Application from PCT/SE2010/050381, filed Apr. 7, 2010, designating the United States and claiming priority to U.S. Provisional Application No. 61/167,273, filed Apr. 7, 2009, the disclosures of which are incorporated herein in their entirety by reference.

TECHNICAL FIELD

The present invention relates to speech codecs in general, and in particular to methods and arrangements for enabling backwards compatible payload formats for such codecs.

BACKGROUND

3GPP specifies AMR and AMR-WB as mandatory speech codecs for voice services in 3 G networks. These codecs are also mandatory for 3GPP VoIP service that is specified within the 3GPP multimedia telephony via IMS. The ruling specification for the media handling and interaction is 3GPP TS 26.114. Despite the mandatory status of these codecs there is presently the desire in 3GPP to specify new voice codecs that will enable even higher service quality than what is possible with AMR-WB.

However, introducing a new speech codec into a speech communications system may be problematic in some respects. One problem is that there is always an installed base of legacy equipment (both terminals and network infrastructure) that does only support the existing 3GPP codecs or just one of them, for instance AMR-WB, rather than the new codec. This may lead to interoperability problems in which communication between new and legacy equipment is not possible unless proper mechanisms are implemented in the system. Traditional ways to address this problem is the provisioning of transcoders in e.g. media gateways that translate between the new and the old coding formats, or the provisioning of the legacy codecs besides the new codec in new terminals that allows choosing the legacy coding format when a connection to a legacy terminal is established. This latter method requires that there is a capability exchange between the terminals prior to the actual speech connection that identifies the common codec that both terminals support. Within the IMS the session description protocol (SDP) IETF RFC 4566 is used to carry out this capability exchange.

The above described ways for ensuring interoperability when introducing a new codec into a communication system are not the only possibilities and have various disadvantages. The provisioning of transcoders means additional equipment that raises the network investment and maintenance costs. Transcoding is also associated with undesirable speech quality degradations. Using the capability exchange between the terminals prior to the call is a very elegant way, which however may not always be possible. Examples where this is not always possible are multi-party conferencing, hand-over scenarios with mobile users roaming to cells without MTSI support, voice messaging. Also from terminal implementation point of view it may be undesirable to provide support for the complete set of new and legacy codecs as this may increase implementation and technology licensing costs.

Consequently, there is a need for enabling the introduction of new speech codecs into telecommunication systems to provide an improved quality of service, in particular to 3GPP systems, whilst maintaining backwards compatibility with old or legacy codecs.

SUMMARY

The present invention relates to methods of introducing new speech codecs into legacy systems.

In particular, the present invention discloses a backwards compatible payload format which allows inclusion of a new speech codec.

In a method of providing a backward and forward compatible speech codec payload format, the following steps are included: providing S10 a RTP package; including S20 payload according to a first codec into the provided RTP package, and appending S50 payload according to a second codec into the provided RTP package. In addition, at least one unused bit is located S30 in the included first codec payload, and the located at least one unused bit is designated S40 as a codec compatibility bit. Finally, the designated at least one codec compatibility bit utilized S60 to provide an indication of the presence of the appended second codec payload.

According to another aspect, the present invention discloses an encoder arrangement for providing a backward and forward compatible speech codec format includes means for providing 10 a RTP packet, means for including 20 payload according to a first codec into the RTP packet, and means for locating 30 at least one unused bit in the included payload. In addition, the encoder arrangement includes means for designating 40 the located at least one unused bit as a codec compatibility bit, and means for appending 50 payload according to a second codec into the RTP package, wherein the second codec is different from said first codec. Finally, the arrangement includes means for utilizing 60 the designated at least one codec compatibility bit to provide an indication of the presence of the appended second codec payload.

According to yet another aspect, the present invention discloses a decoder arrangement for enabling backward and forward compatible speech codecs in a telecommunication system. The decoder includes means for 100 receiving a RTP packet, which includes a payload according to a first codec, an appended payload according to a second codec, and at least one compatabilty bit providing an indication of the presence of the second codec, means for 200 identifying the compatibility bit in the RTP packet, and means for 300 unpacking the second codec payload in the RTP packet, based on the identified compatibility bit.

Advantages of the present invention include:

Providing a backward compatible payload format for media frames that enables a legacy decoder/receiver to exchange media data with a new encoder/transmitter and vice versa.

BRIEF DESCRIPTION OF THE DRAWINGS

The invention, together with further objects and advantages thereof, may best be understood by referring to the following description taken together with the accompanying drawings, in which:

FIG. 2 is an illustration of bandwidth-efficient mode of the AMR/AMR-WB payload format;

FIG. 3 is an illustration of octet-aligned mode of the AMR/AMR-WB payload format;

FIG. 9 is an illustration of a backward compatible payload format according to an embodiment of the present invention;

FIG. 13 is an illustration of a backward compatible payload format according to an embodiment of the present invention

ABBREVIATIONS

Figure 1:
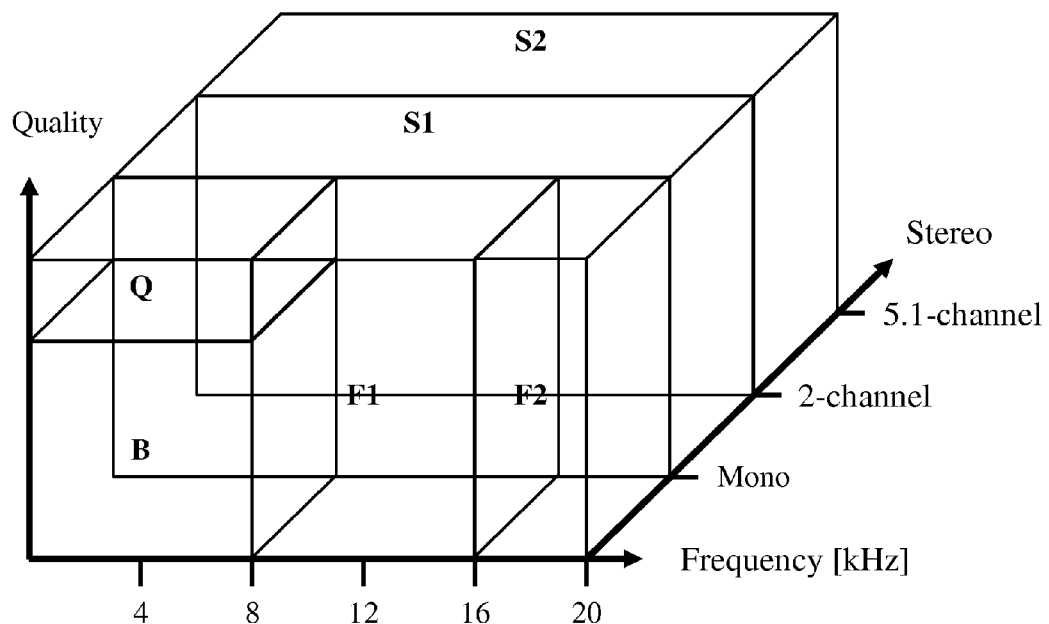
FIG. 1 is a schematic illustration of a sound signal encoded with multiple enhancement layers.

| | |
|---|---|
| 3GPP | 3rd Generation Partnership Project |
| AMR | Adaptive Multi Rate |
| AMR-WB | AMR Wide Band |
| CMR | Codec Mode Request |
| E-UTRAN | Evolved UTRAN |
| IMS | IP Multimedia Subsystem |
| HSPA | High Speed Packet Access |
| LTE | Long Term Evolution |
| MTSI | Multimedia Telephony Service for IMS |
| RTP | Real-Time Protocol |
| SDP | Session Description Protocol |
| ToC | Table of Content |
| UE | User Equipment |
| UMTS | Universal Mobile Telecommunication System |
| UTRAN | UMTS Terrestrial Radio Network |

DETAILED DESCRIPTION

The present invention will be described with reference to a system where legacy codecs are AMR and AMR-WB, however the invention is equally applicable to similar systems where new speech codecs need to be backwards compatible.

Due to the above described problems, a preferable solution is that a new codec is bitstream interoperable with (at least) one of any existing legacy codecs. This means that the new codec uses bitstreams in which the bitstream of the legacy codec is embedded. The bitstream of the legacy codec typically corresponds hereby to a primary encoding of the signal with the legacy encoder yielding a first quality level. The remaining part of the bitstream corresponds to enhancement information enhancing the primary decoded signal to result in a secondary decoded signal yielding a second quality level that is higher than the first quality level. A consequence of this bitstream interoperability is thus backward compatibility to the legacy codec. That is, the new encoder can directly interoperate with the legacy decoder and vice-versa the legacy encoder is interoperable with the new decoder.

While this kind of bitstream "embeddedness" on codec level is a necessary condition for interoperability, there are further aspects that need to be fulfilled in order to achieve interoperability on system level. Two further essential aspects are SDP signaling compatibility and compatibility of the bitstream transport formats. With respect to the SDP capability, negotiation it is desirable that this can be done between new and legacy devices in a transparent way meaning that the legacy device that is unaware of the new codec still can establish a speech service session with the new device.

The transport format to be used for the speech bitstream data in case of 3GPP MTSI follows the IETF specification for the transport protocol for real-time applications (RTP) IETF RFC 3550 and the speech codec specific speech payload format specification, which in case of AMR and AMR-WB is IETF RFC 4867. Obviously, the legacy terminal relies on that specific speech payload format and it would not be able to create or properly receive a speech bitstream according to another (new) format.

The present invention describes ways to overcome these problems which will allow a system-level interoperability between legacy terminals supporting AMR-WB based MTSI and new terminals deploying MTSI based on a new bitstream interoperable codec.

In particular, this invention describes how to create an RTP payload format for a new codec in such a way that it is backwards compatible with an RTP payload format used for a legacy codec. It also describes how to use such a backwards compatible payload format in: new clients; in legacy clients; and in network nodes such as media gateways and application servers.

Basically, according to an embodiment of the present invention, a backwards compatible RTP payload format is created by packing the following into the RTP payload:
1. Insert the payload from the legacy codec
2. Locating and using at least one unused bit from the payload from the legacy codec to signal that the RTP payload is extended with extension layer(s). Another name for this signal would be compatibility bit, "escape bit" or "escape sequence" depending on whether it is one bit or a few bits. If all bits in the payload are already used by the payload from the legacy codec then it is possible to pad the payload to a larger size with unused extension bits or padding bits and use at least one of these padding bits to signal that the payload contains extension layer(s).

3. Append the extension layer(s) for the new codec.

With this format, legacy decoders will extract the speech frames for the legacy codec from the payload, use these frames, and disregard the remaining parts of the RTP payload. The reason for why the decoder has to disregard the remaining parts is that there is a general requirement that other functions are allowed to add padding to the payload. Encryption algorithms can for example, use this if they require a fix RTP packet size or RTP packets of a certain size.

Implementations of the embodiments of the new codec according to the present invention would typically first extract the speech frames for the legacy codec, then detect the compatibility bit or escape bit (or escape sequence) and then continue with extracting the remaining payload. However, for some embodiments it would be beneficial to perform the steps in the opposite order.

Media gateways, conference servers or other application servers can convert the new payload to a legacy payload with minimum complexity by extracting the payload from the legacy codec and pack this information into new RTP packets that exactly follow the payload format for the legacy codec. The escape bit/sequence and the additional information is then disregarded.

In order to provide proper understanding and appreciation of the benefits of the present invention, a detailed description of the particulars of RTP payload formats and speech codecs will be included below.

One important element of the backwards compatible payload format according to the present invention is the use of so called layered encoding. Layered encoding uses a base layer and one or more extension layers. One example, with reference to the conceptual drawing in FIG. 1, of such a configuration is:

Base layer B: The legacy codec, for example AMR-WB 12.65 kbps mode, which uses 16 kHz sampling and thus encodes a mono signal up to 8 kHz. Due to filtering, the encoded sound signal is actually bounded to 50-7000 Hz.

Quality extension layer Q: Extension layer(s) that improves the quality of the signal. It encodes the same audio bandwidth as the base layer but improves the encoding quality, i.e. results in less audible distortions. There may be one or several quality enhancement layers.

Frequency extension layer F: Extension layer(s) that improves the acoustic bandwidth of the signal. One example is an enhancement layer that encodes sound up to 16 kHz. The base layer is removed from the original sound signal before encoding so that only the difference is encoded. There may be one or several extension layers that improves the acoustic bandwidth in one or more steps, for example 7→16 kHz and 16→20 kHz.

Stereo extension layer S: An extension layer that adds stereo to the sound signal. The mono signal (50-16000 Hz) can be used and the extension layer thus encodes: 1) the difference between the left channel signal and the mono signal; 2) the difference between the right channel signal and the mono signal. Another possibility is to assign the mono signal to either the left or right channel and then encode the difference between the left and right channels. There may be one or several extension layers, for example, one extension layer to add 2-channel stereo and another extension layer to add 5.1-channel stereo.

It should be clear to anyone experienced in the art that there may be other types of extension layers with finer or coarser granularity than what has been described above.

Some examples are: quality extension layers that increase the bit rate in small steps, e.g. steps of 1 kbps, and thus improve the quality almost gradually; frequency extension layers that add 1 kHz per layer; or stereo layers that go from mono→2-channel→2.1-channel→3.1-channel→4.1-channel→5.1-channel, etc. There may also be combinations of extension layers, for example a layer that improves the quality of a frequency extension layer.

The type and number of extension layers is not important for this innovation. What is important is that the base layer uses a legacy codec, for which an RTP payload format has already been defined, and the extension layer(s) are used to improve the user experience.

The legacy codec used in this description is AMR-WB [1] but the solutions described here are not limited to only this codec. In fact, some or all of the solutions can be used for most speech codecs, for example AMR [2] and ITU-T G.711[4], G.726[5] and G.729[6].

The solutions described here are not limited to speech but can be used for any kind of media such as audio, video and text or other.

Another important element for the embodiments of the present invention is the structure of the RTP payload i.e. the RTP payload format itself, which will be described with reference to FIG. 2 and FIG. 3. The figures illustrate a few examples of possible RTP payloads containing media. The payload format for AMR and AMR-WB is described in RFC4867, [3]. The RTP payload format exists in two modes: bandwidth-efficient (FIG. 2) and octet-aligned (FIG. 3). The RTP header is not shown in these figures.

With reference to FIG. 2 and FIG. 3, the RTP payload starts with a so called payload header containing the CMR (Code Mode Request) information. The CMR is typically 4 bits. The RTP payload then continues with one ToC (Table of Contents) entry for each speech frame that is included in the payload. In FIG. 2 only one media frame is included, and FIG. 3 two frames are included in the packet. Each ToC entry contains the F (1 bit), FT (4 bits) and Q (1 bit) fields, as described with reference to FIG. 1. Each ToC entry is thus 6 bits. The speech data bits for all speech frames are then appended to the payload starting with the oldest frame. RTP packets are typically required to be an integer number of octets. A few padding bits (P) are therefore typically inserted at the end of the payload to fulfill this requirement.

Typically, for the octet aligned mode, the CMR field is extended with a few reserved bits (indicated with R in FIG. 3) to make the field one octet long. Each ToC entry is padded with padding bits (indicated with P in FIG. 3) to make it one octet long. Finally, each block of frame data is padded with padding bits (indicated with P in FIG. 3) to be an integer number of octets before it is added to the payload. Thereby, all elements of the payload are guaranteed to be an integer number of octets each there is no need for a final padding in the end of the payload.

According to the present invention, the above mentioned unused bits or padding bits or reserved bits are utilized to include signaling bits relating to extension layers e.g. presence of included new codecs or other functionality. Consequently, one or more unused bits in the RTP payload from the legacy codec are used to indicate that one or more extension layers have been appended to the payload. This can be done in several ways depending on what payload format that is used.

Figure 4:
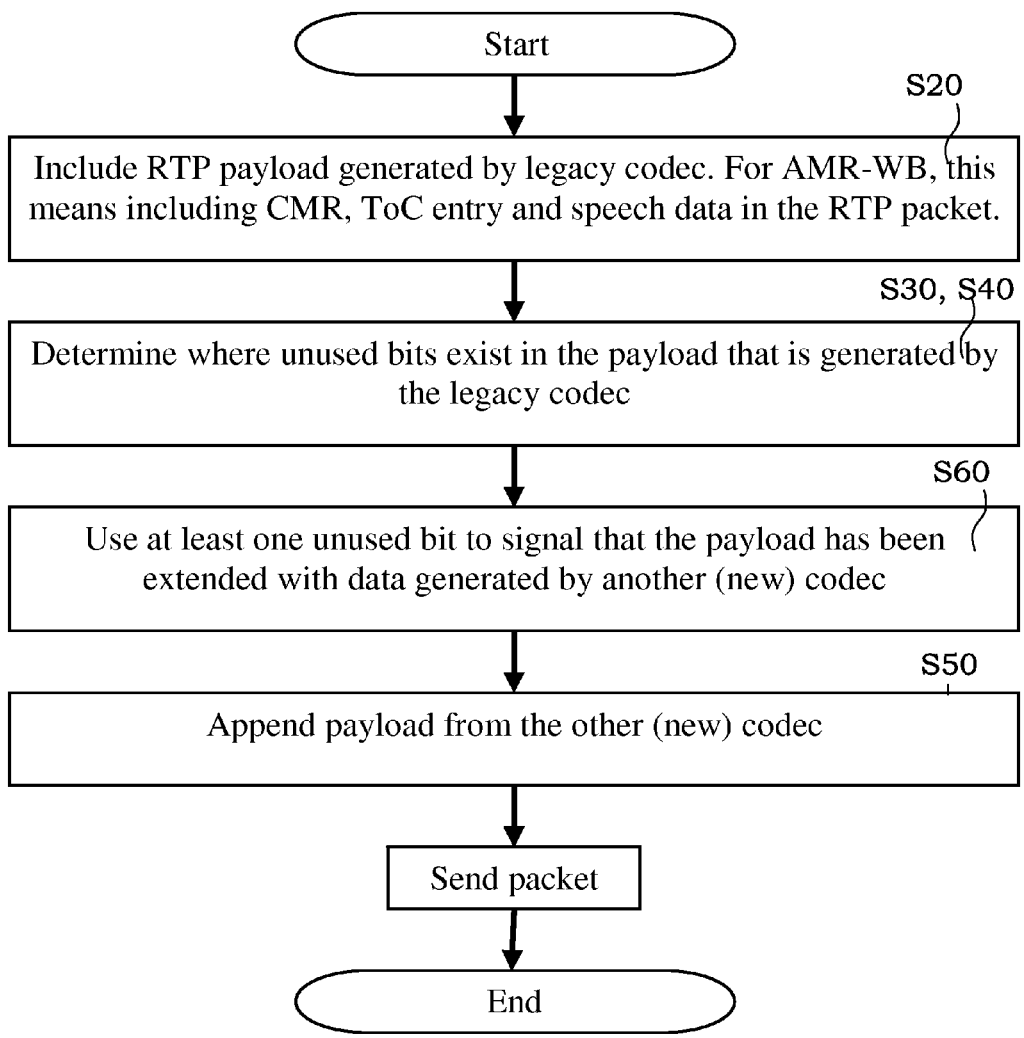
FIG. 4 is a schematic flow chart of an embodiment of a method according to the present invention.

The most basic embodiment of a method of providing a backward compatible payload packet format of the present invention in a transmitter or encoder will be described with reference to FIG. 4. Initially, the RTP payload generated by a legacy codec is included S20 in a RTP packet, in the case of AMR-WB this means including CMR, ToC entry and speech data in the RTP packet. For other codecs, there are other similar fields and information that need to be inserted. Subsequently, it is determined S30, S40 if there are unused bits in the included legacy codec payload. At least one of the determined unused bits is then utilized S60 to signal that the payload has been extended with data generated by another or new codec. In this context, the term new can be used not only in comparison to a legacy codec but also to a new mode or modes of operation. Finally, the new codec payload is appended S50 to the RTP packet, and the packet is sent. It is implied that the order of the steps of the embodiment can be changed.

Figure 5:
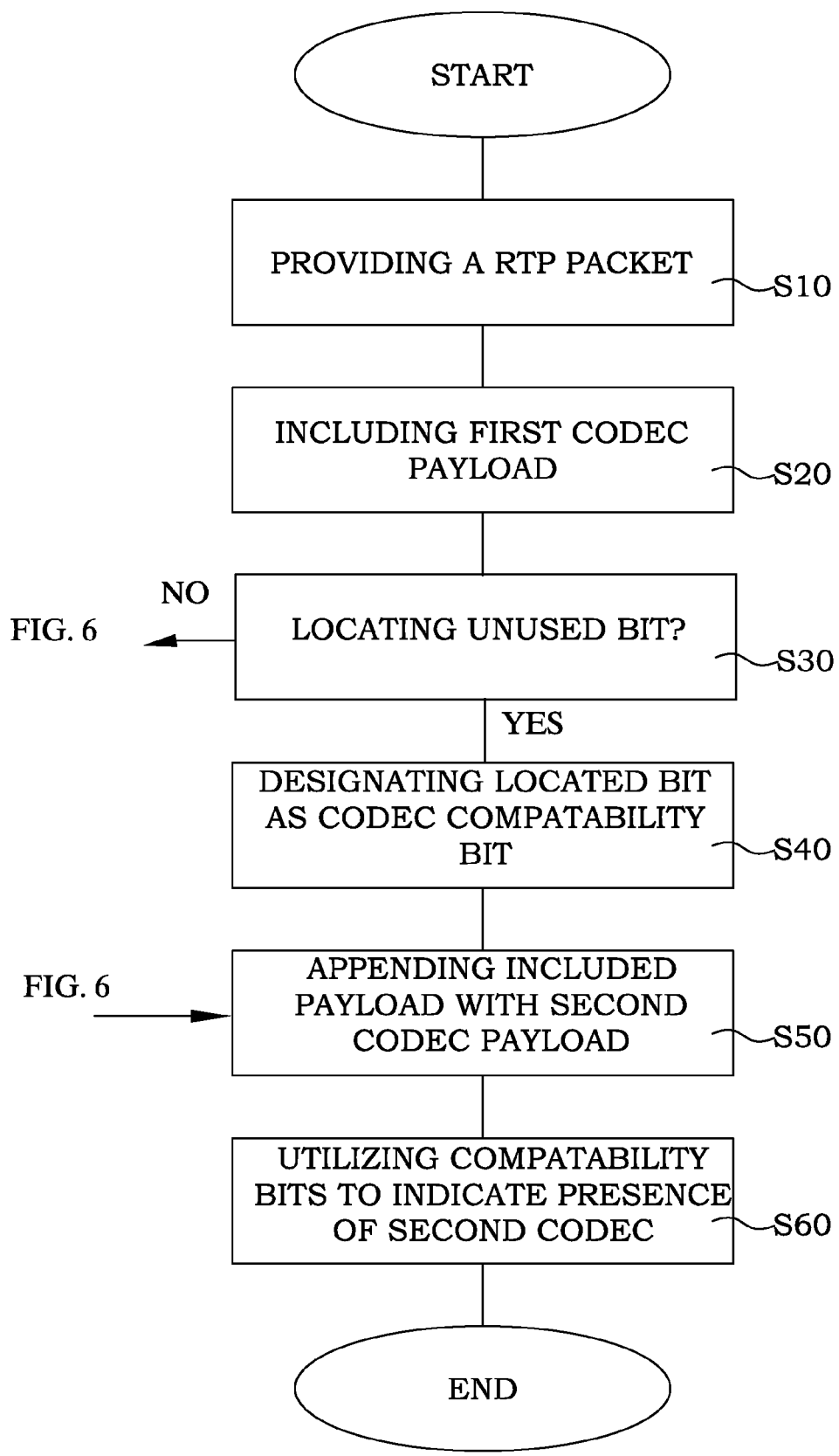
FIG. 5 is a schematic flow chart of an embodiment of a method according to the present invention.

A more specific embodiment of a method of enabling backward and forward compatible speech codecs will be described with reference to FIG. 5 and FIG. 6. In correspondence with the previously general embodiment, a first step is to provide S10 a RTP packet, which is to be transmitted by the transmitter or decoder. Both a first e.g. legacy codec payload and a second e.g. new codec payload are included into the provided RTP packet in step S20 and S50. Subsequently, one or more unused bits are located or identified S30 in the included first or legacy codec payload. If at least one such unused bit is located it is designating S40 as a codec compatibility bit. Potentially, more than one unused bit is located, and for some implementations, there is need to designate more than one compatibility bit. Finally, at least one of the compatibility bits is utilized S60 to provide an indication of the presence of the included new codec payload. It is implied that the order of the steps of the embodiment can be changed.

Figure 6:
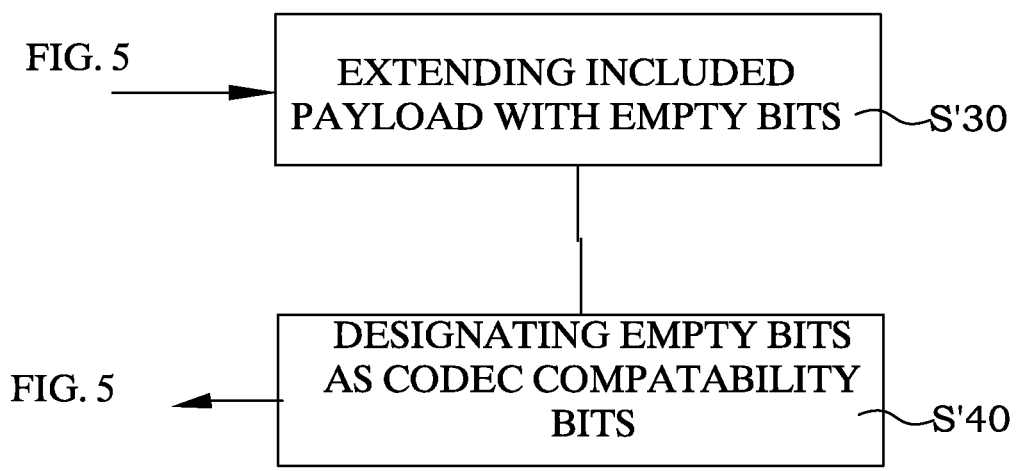
FIG. 6 is a schematic flow chart of a further embodiment of a method according to the present invention.

With reference to FIG. 6, if no unused bits are located additional steps may, according to a particular embodiment of the present invention, need to be taken. Accordingly, if no unused bits are located, or if too few unused bits are located, it is necessary to add bits or extend the payload with new bits. Consequently, in step S'30 the included legacy payload is extended with unused bits and the extended bits are designated S'40 as the compatibility bits. It is implied that the order of the steps of the embodiment can be changed.

Typically the payload includes a payload header and speech data frames. Depending on the codec the header is formatted differently.

Figure 7:
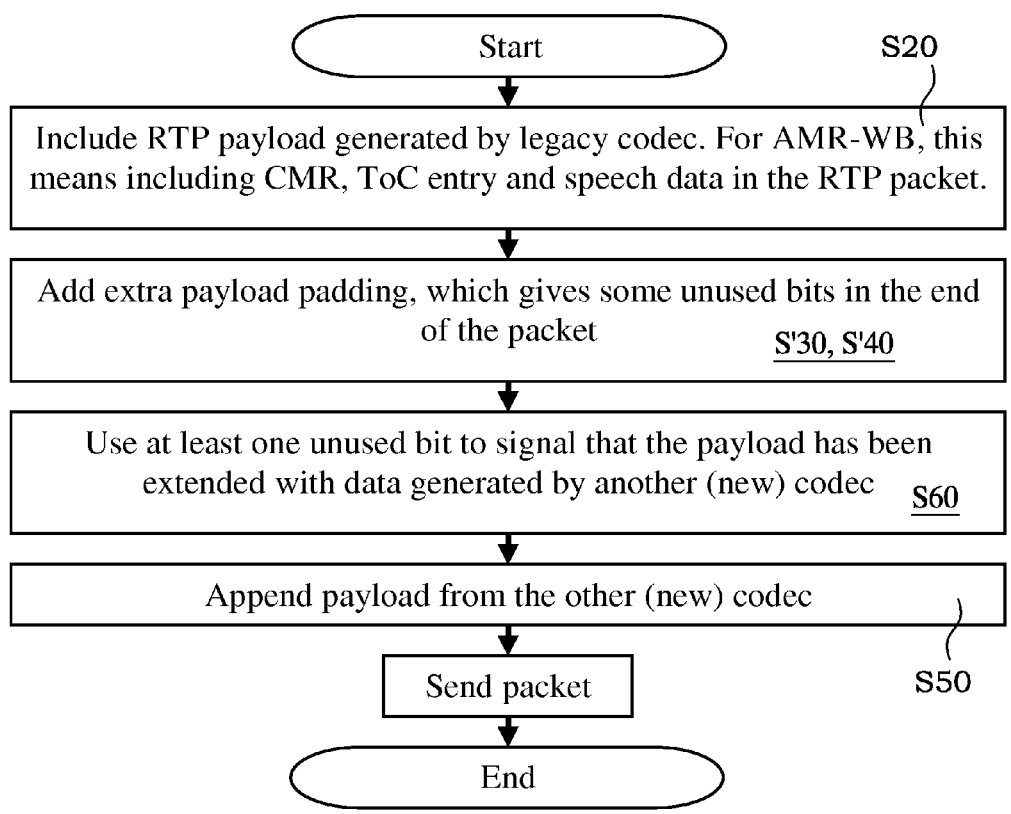
FIG. 7 is a schematic flow chart of a further embodiment of a method according to the present invention.
Figure 8:
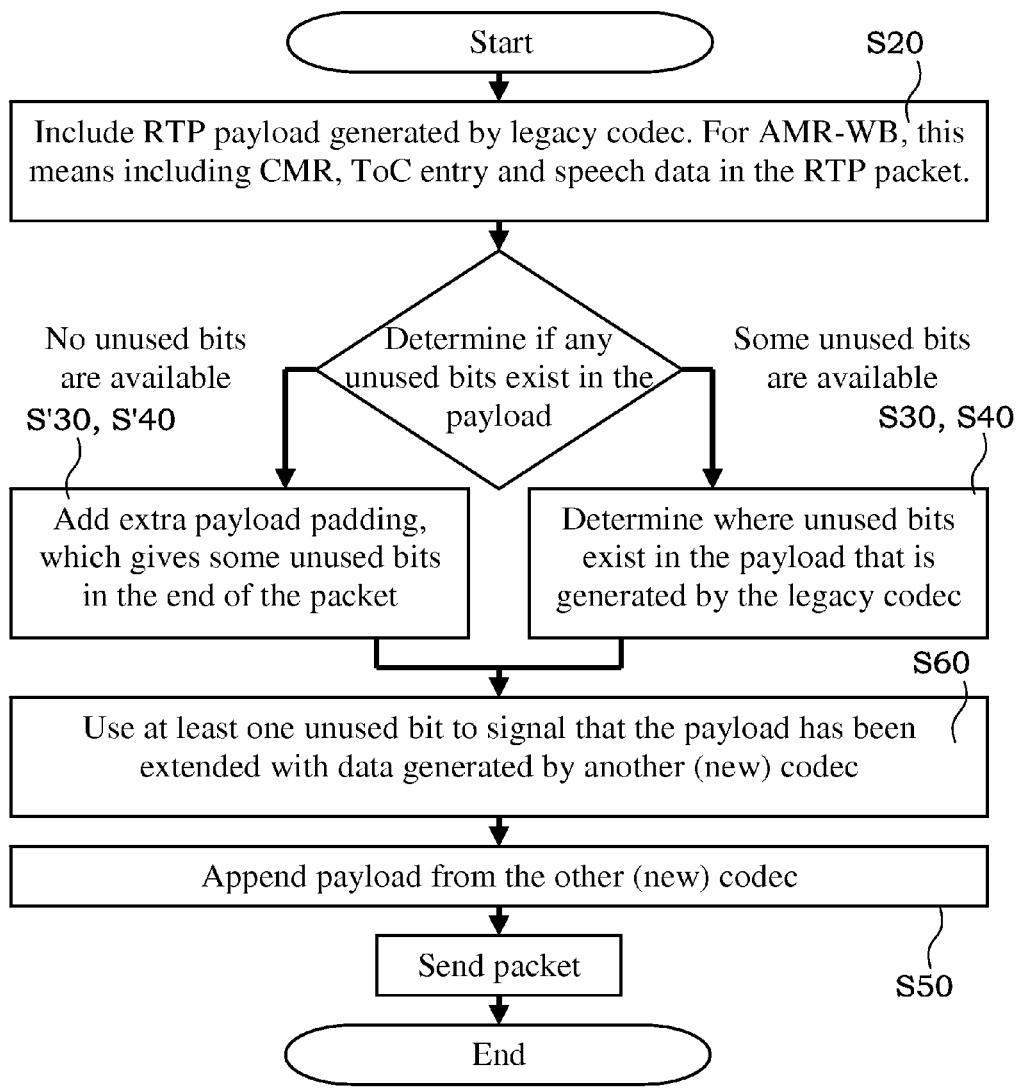
FIG. 8 is a schematic flow chart of a further embodiment of a method according to the present invention.

FIG. 7 and FIG. 8 are flowcharts illustrating different embodiments of the above described method.

FIG. 7 illustrates how a transmitter or encoder can generate the backwards compatible payload format according to an embodiment of the present invention. In some cases it is known in advance that the RTP payload will always contain some unused bits. Some examples of such cases are:

When the octet-aligned version of AMR/AMR-WB payload format is used.

When the bandwidth-efficient payload format version is used but the codec operation and the frame encapsulation is limited to modes (or bit rates) that will require padding to fill up the RTP packet to an integer number of bytes.

Accordingly, with reference to FIG. 7, upon initiation of the embodiment the RTP payload generated by a legacy codec is included S20 in the RTP packet. For the case of AMR-WB this means including CMR, ToC and speech data in the RTP packet. Subsequently, extra payload padding e.g. extension bits, is included S30, S'30, S'40 in order to provide some unused bits at the end of the packet. At least one of the provided bits is used S60 to signal that the payload has been extended with data generated by another or new codec. Finally, the new codec payload is appended S50 to the RTP packet and the entire packet is sent.

FIG. 8 illustrates the case where it is unknown if the payload format includes any unused bits, consequently the transmitter or encoder needs to detect if there are any unused bits or not in the payload and take appropriate action depending on the outcome of the detection. Similarly, as for previously described embodiments, RTP payload according to a legacy codec is included S20 in an RTP packet. In the case of AMR-WB, this includes CMR, ToC and speech data. Subsequently, a step of determining if there are any available unused bits in the payload is performed. If no unused bits are available, extra payload padding is added S'30, S'40 to provide those unused bits at the end of the packet. If some unused bits are available, the location of those bits in the legacy codec payload is determined S30. Then at least one of the unused bits is used S60 to signal that the payload has been extended with data generated by another or new codec. Finally, the payload from the new codec is appended S50 to the RTP packet and the packet is sent.

In order to further explain the details of the different ways of using unused bits or extending the payload with empty bits depending on if the octet-aligned mode or the bandwidth efficient mode is used, the following detailed description with reference to FIG. 9-14 is disclosed.

With reference to FIG. 9, the utilization of reserved bits in the payload header for octet-aligned mode of AMR/AMR-WB will be described. In the octet-aligned mode of the AMR/AMR-WB payload format there are typically four reserved bits in the payload header that are not used by a legacy codec. One, a few or all of these reserved bits can be used to signal whether there are extension layer(s) in the RTP payload. The AMR/AMR-WB payload format additionally defines that the reserved bits in the payload header must be ignored by a legacy receiver. A new codec can therefore use these bits and indicate whether there are one or more extension layers in the RTP payload. This is not limited to only the AMR/AMR-WB payload format as described above, but can also be used by any payload format where there is a CMR field or corresponding field with some unused bits.

Figure 10:
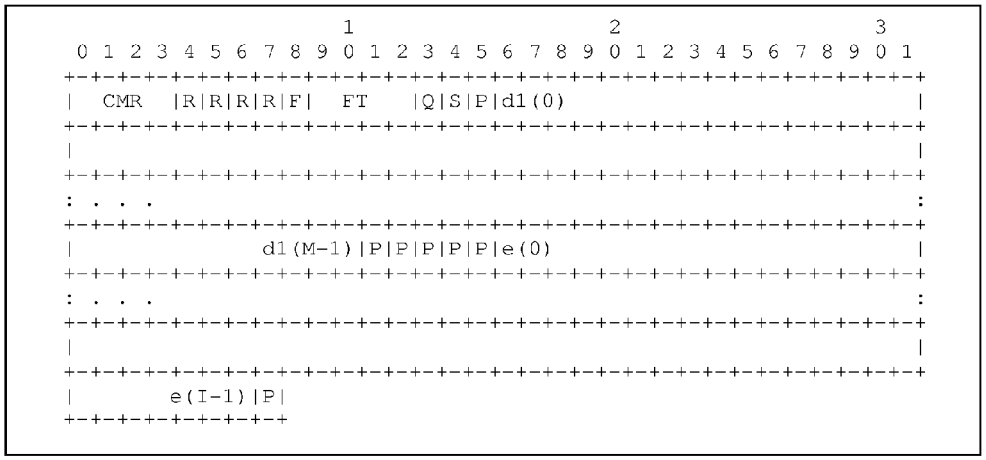
FIG. 10 is an illustration of a backward compatible payload format according to an embodiment of the present invention.

With reference to FIG. 10, the utilization of padding bits in the ToC entry for octet-aligned mode of AMR/AMR-WB will be described. In the octet-aligned mode of the AMR/AMR-WB payload format there are typically two padding bits in each ToC entry that are not used by a legacy codec. One, a few or all of these padding bits can be used to signal whether there are extension layer(s) in the RTP payload. The AMR/AMR-WB payload format defines that the padding bits in the ToC entry must be ignored by a legacy receiver. The benefit with this embodiment is that it enables indication of whether there are extension layer(s) for each individual frame. This solution is not limited to only the AMR/AMR-WB payload format but can also be used by any payload format where there are ToC fields with some unused bits.

Figure 11:
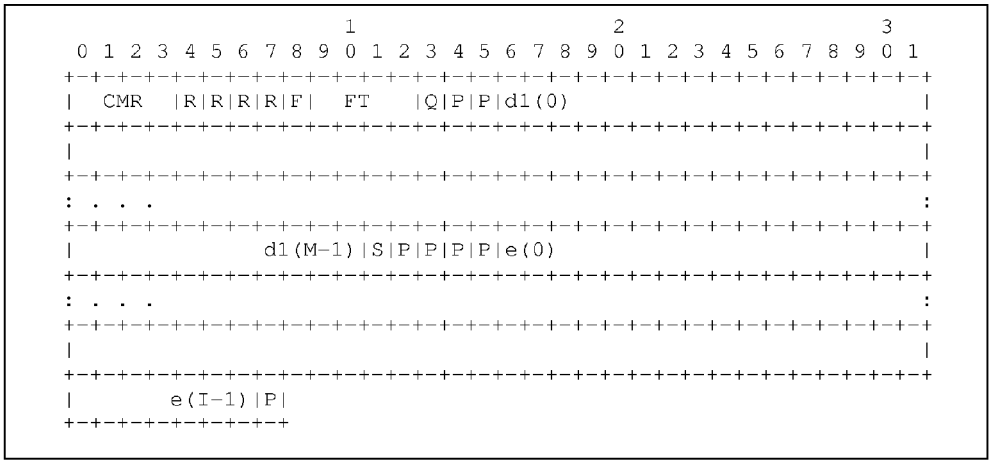
FIG. 11 is an illustration of a backward compatible payload format according to an embodiment of the present invention.

With reference to FIG. 11, the utilization of padding bits in the frame padding for octet-aligned mode of AMR/AMR-WB will be described. In the octet-aligned mode of the AMR/AMR-WB payload format there may be one or more padding bits at the end of each included frame block if the encoded speech frame does not utilize all of the available bits in the last octet of the payload. One, a few or all of these padding bits can be used to signal whether there are extension layer(s) in the RTP payload. The AMR/AMR-WB payload format defines that all padding bits in the end of each frame must be ignored by a legacy receiver. Similar to the preceding embodiment, it is with this embodiment possible to indicate the existence of the extension layer(s) independently for each frame. This solution is not limited to only the AMR/AMR-WB payload format but can also be used by any payload format where the length of each frame is not an integer number of octets and where thus are some unused bits for each frame that is included in the payload.

Figure 12:
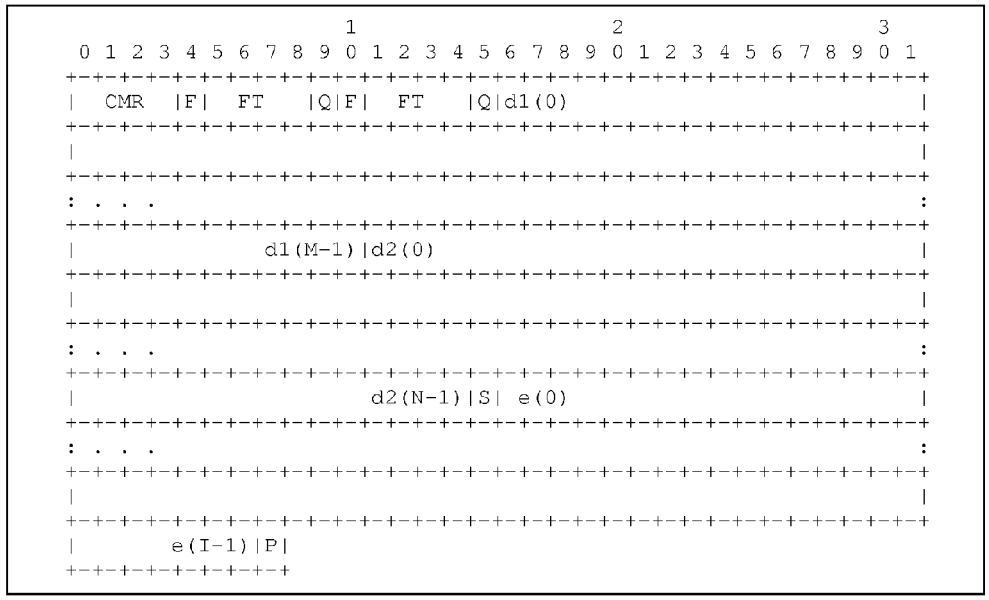
FIG. 12 is an illustration of a backward compatible payload format according to an embodiment of the present invention

With reference to FIG. 12, the utilization of padding bits in the payload padding for bandwidth-efficient mode of AMR/AMR-WB will be described. In the bandwidth-efficient mode of the AMR/AMR-WB payload format, there are no reserved bits in the payload header and there are no padding bits for each ToC entry. However, since the AMR and AMR-WB codecs were originally designed for circuit switched channels, and IP was not considered at that time, most combinations of frame(s) will result in one or a few unused bits in the end of the complete RTP payload. One, a few or all of these padding bits can be used to signal whether there are extension layer(s) in the RTP payload. The AMR/AMR-WB payload format defines that all payload padding bits must be ignored by the receiver. This solution can be used to indicate whether there are extension layer(s) in the payload. This solution is not limited to only the AMR/AMR-WB payload format but can also be used by any payload format where there are some unused bits in the end of the payload.

The above described examples may be used individually or in combination, depending on the situation in which it is implemented.

Below will follow a few detailed examples concerning the case where no unused bits have been identified, and instead empty bits need to be added to the header or frames of the speech data.

With reference to FIG. 13, utilizing extra payload padding for RTP padding will be described. Some codecs, such as ITU-T Recommendations G.711 and G.726, generates RTP payloads that are always an integer number of octets and there are therefore no unused bits in the payload. Similarly, it may also happen that there are no unused bits for other codecs, if several frames are included in the payload and the sum of the bits add up to an integer number of octets.

In this case, it is possible to add additional padding octets to the end of the payload and use one or several of these bits to signal that there are extension layers in the payload. This is done by (see RFC 3550, [7]):
 setting the padding bit (P) in the RTP header to 1;
 adding padding octets to the end of the payload;
 inserting the number of padding octets into the last octet of the padding;
 using some of the bits in the padding octet(s) for the signal that there are extension layer(s) in the payload.

Since the last octet of the padding is used to indicate the number of inserted padding octets then this octet cannot be used to indicate the existence of the extension layer(s). Hence, it is necessary to add at least 2 octets. Normally, the padding counter (Pcount) would indicate how many octets the extra padding contains (including Pcount). To make the payload format backwards compatible, Pcount would also need to include the number of octets used for the extension data. This embodiment is not limited to only G.711 and G.726 but can actually be used by all payload formats.

Figure 14:
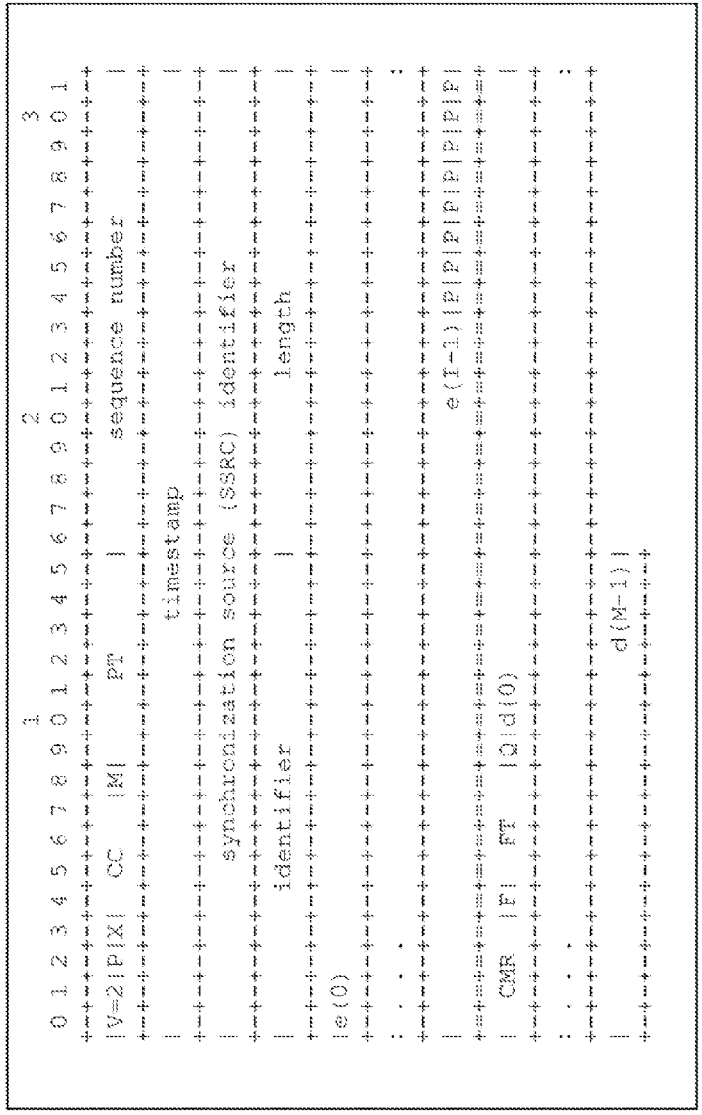
FIG. 14 is an illustration of a backward compatible payload format according to an embodiment of the present invention

With reference to FIG. 14, adding unused bits between the RTP header and the RTP payload will be described. A further possibility is to insert the necessary extension data in a header extension in-between the RTP header and the RTP payload. This solution is backwards compatible since all implementations are required to understand the extension bit (X) and, if this bit is set, must be capable of understanding the length indicator in the header extension and must also be capable of removing the full header extension if it does not understand the RTP header extension identifier. This solution can therefore be used for all payload formats.

In order to properly introduce the above described backward compatible payload format, a receiver or decoder or un-packetizer in support of the new codec needs to be able to acknowledge the presence of the previously introduced compatibility bits in the RTP packet and act upon their detection.

Figure 15:
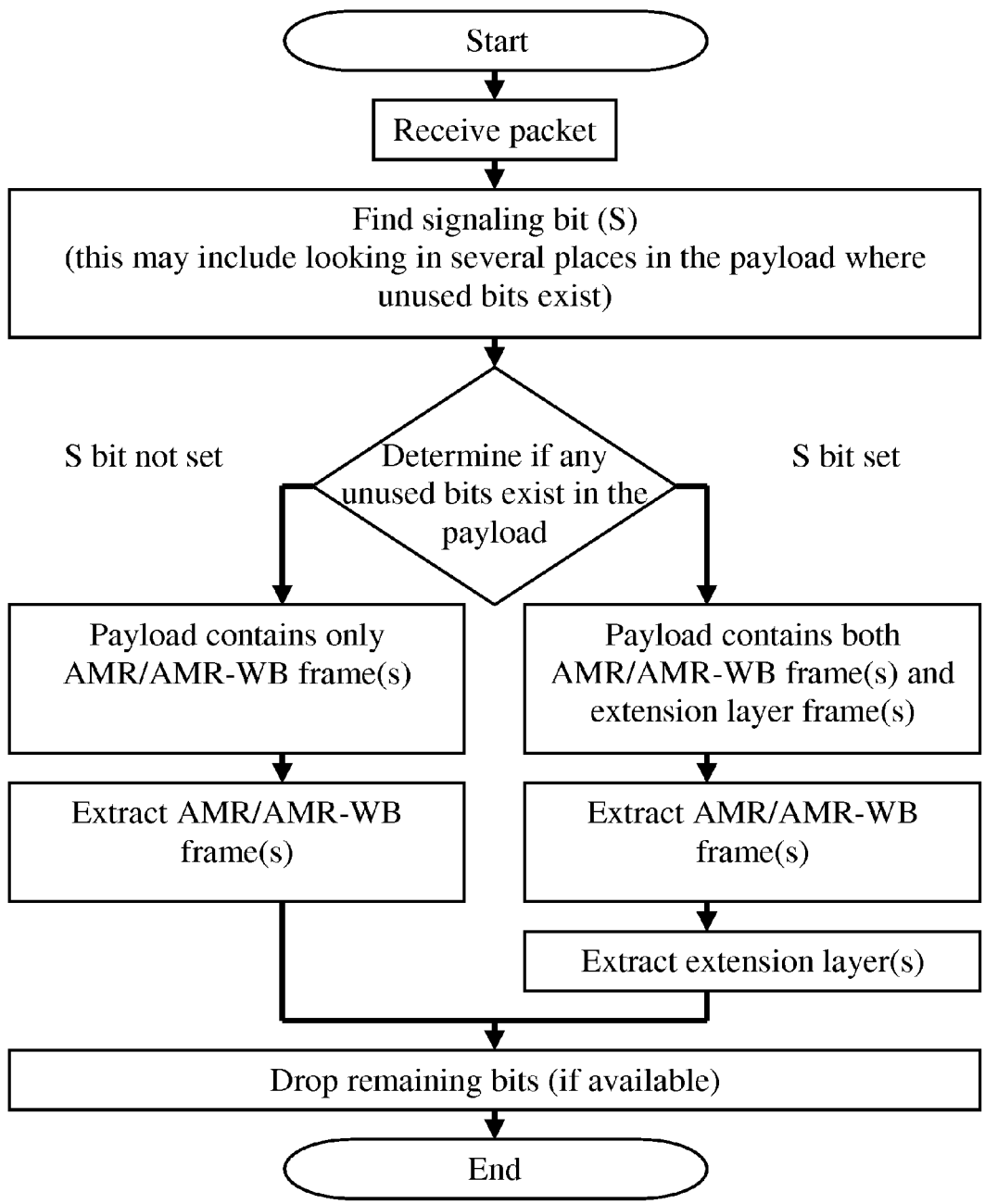
FIG. 15 is a schematic flow chart of a further embodiment of a method according to the present invention.

With reference to FIG. 15, the functionality of such a new codec receiver/decoder/un-packetizer will be described. A legacy receiver would not be aware of the signaling bit (S) or compatibility bit due to instructions to ignore any padding or unused bits in the payload, and would therefore extract the legacy AMR/AMR-WB frames and would drop the remaining bits (if they are available). In contrast, a new receiver according to the present invention, would be adapted to handle the new payload format and would need to find the signaling bit (S) or compatibility bit to determine if any extension layers exist in the payload. Consequently, a method in a receiver according to the present invention would include the steps of receiving a RTP packet and subsequently identifying at least one designated compatibility bit (S). This may include looking in several places in the payload where unused bits exist or are known to exist. If no compatibility bit is detected in the payload, the receiver acknowledges that the payload only contains AMR/AMR-WB frames and extracts those according to known measures and finally drops remaining available bits. If at least one compatibility bit (S) is detected, the receiver acknowledges that both AMR/AMR-WB frames and extension layer frames exist. Consequently, the receiver extracts one or both of the AMR/AMR-WB and the extension layers. Finally, the remaining available bits are dropped.

Below will follow a specific example, with reference to FIG. 16, of a system in which the present invention would be beneficial. The system includes a media gateway, a conference server, and an application server As described above, the new payload format is backwards compatible with the legacy payload format. This enables setting up a session between a new terminal and a legacy terminal without the need for translation in a media gateway. Still, there are scenarios where simple handling in media gateways and other network equipment is beneficial. A few examples are conference calls, voice mails and 3-party calls. Such handling can be done in, for example, media gateways, conference servers and application servers.

As described previously, the conversion between the new payload format and the legacy payload format is quite simple. The reason for why a low-complex solution is beneficial is that such servers handle thousands of calls, so even solutions with moderate complexity become troublesome because of the scale factor.

Figure 16:
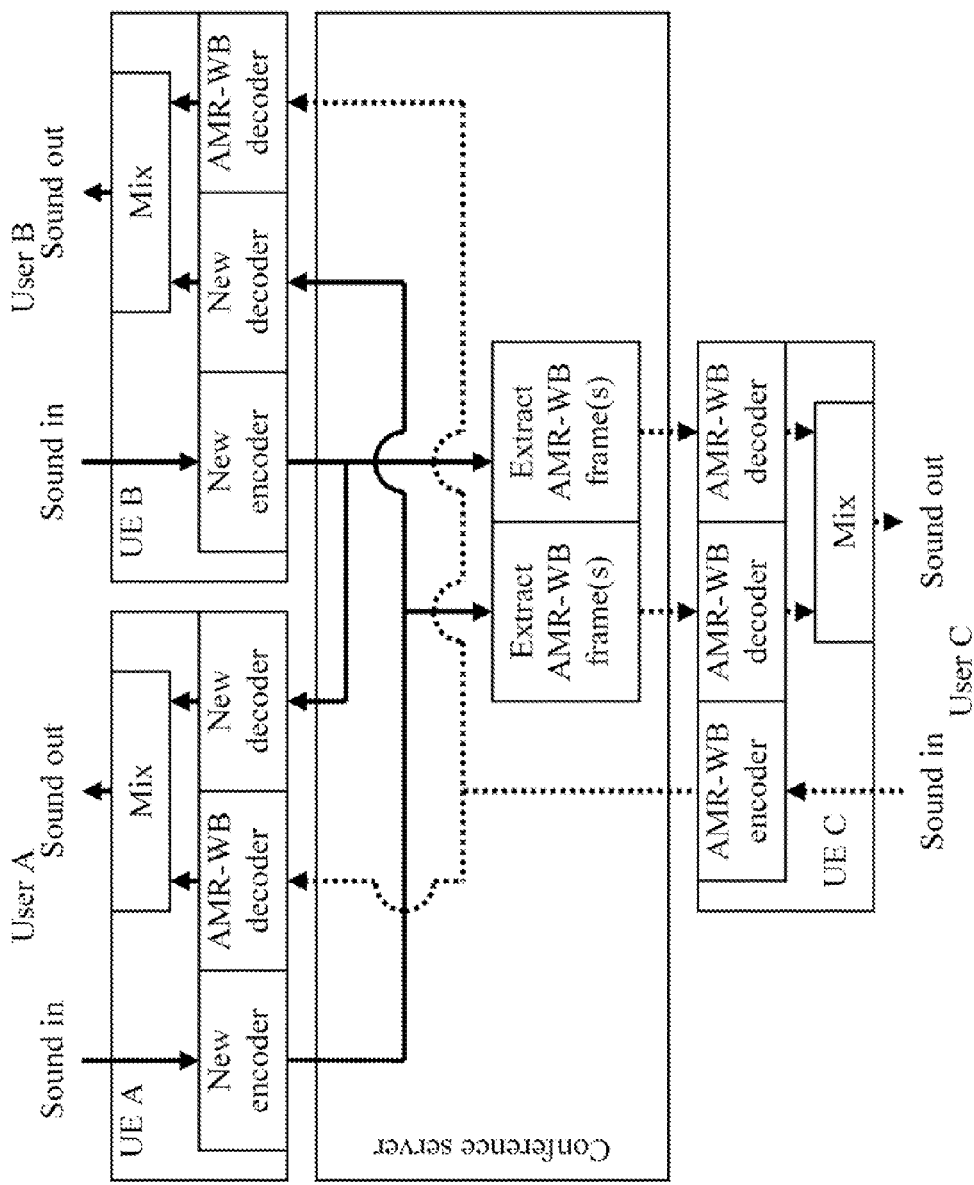
FIG. 16 is a schematic illustration of an embodiment of the present invention when utilized in a conference server during a 3-party call.

The embodiment of the present invention as illustrated in FIG. 16 shows how a 3-party call could be handled by a conference server (could be easily extended to any number of participants). In this case, users A and B each have user equipment (UE) or clients that support the new codec while user C has a UE or client that only supports the legacy (AMR-WB) codec. It is assumed that the mixing of the different media streams is done in the UEs and not in the conference server.

The extraction, in the conference server, of the AMR-WB frames from the RTP packets is optional since it would be possible to send the two speech streams encoded with the new codec directly to the legacy UE. However, to save bandwidth, it is beneficial if the conference server extracts the AMR-WB frames and sends only these frames to receiver(s) that are not capable of handling the extension layers. This becomes especially important as the number of participants in the conference increases.

The extraction of AMR-WB frames according to the present embodiment is very simple:

Receive the packet

Copy the AMR-WB part of the packet

It is possible to clear the S bit, if it is set, although this should make no difference for the receiving AMR-WB UE.

Encapsulate the AMR-WB frame(s) in a new RTP packet

It should be clear that this handling could easily be extended to any number of participants. It should also be clear that this handling could also be done in media gateways and application servers.

Figure 17:
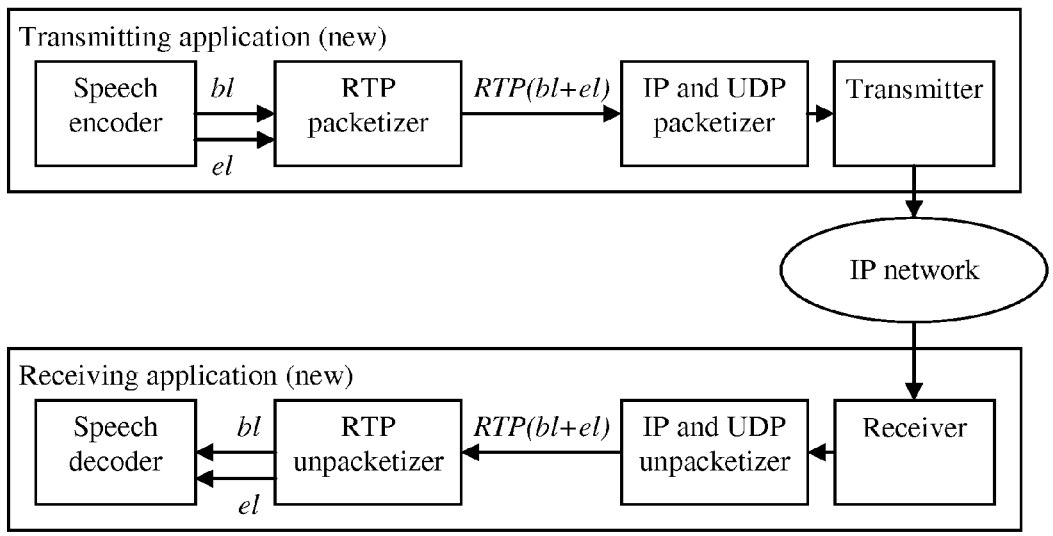
FIG. 17 is a schematic illustration of the function of an embodiment of the present invention.

With reference to FIG. 17, an example of a block diagram with a transmitter containing a new encoder and a receiver containing a new decoder will be described. The speech encoder is a new encoder that generates one base layer b1 according to a legacy codec and an extension layer e1 according to a new codec. Both the base layer and the extension layer are encapsulated into one RTP packet. No new functionality is needed in IP and UDP packetizers and unpacketizers. The transmitter, receiver and IP network are also unchanged. It should be understood that the IP network can be both a fixed network, such as the Internet, but also be a radio network such as 3GPP E-UTRAN (LTE) or HSPA. The decoder is a new decoder which is capable of making use of both the base layer and the extension layer.

Figure 18:
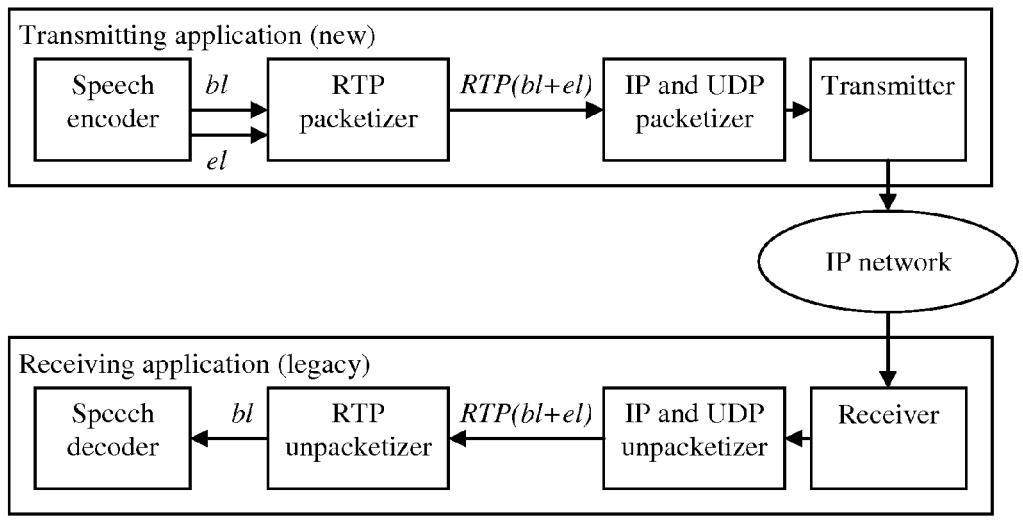
FIG. 18 is a schematic illustration of the function of an embodiment of the present invention.

With reference to FIG. 18, an example of a block diagram with a transmitter containing a new encoder and a receiver containing a legacy decoder will be described. The receiver does not understand or even detect the signalling mechanism and thus only extracts the base layer, e.g. legacy codec frame which is sent to the legacy decoder.

Figure 19:
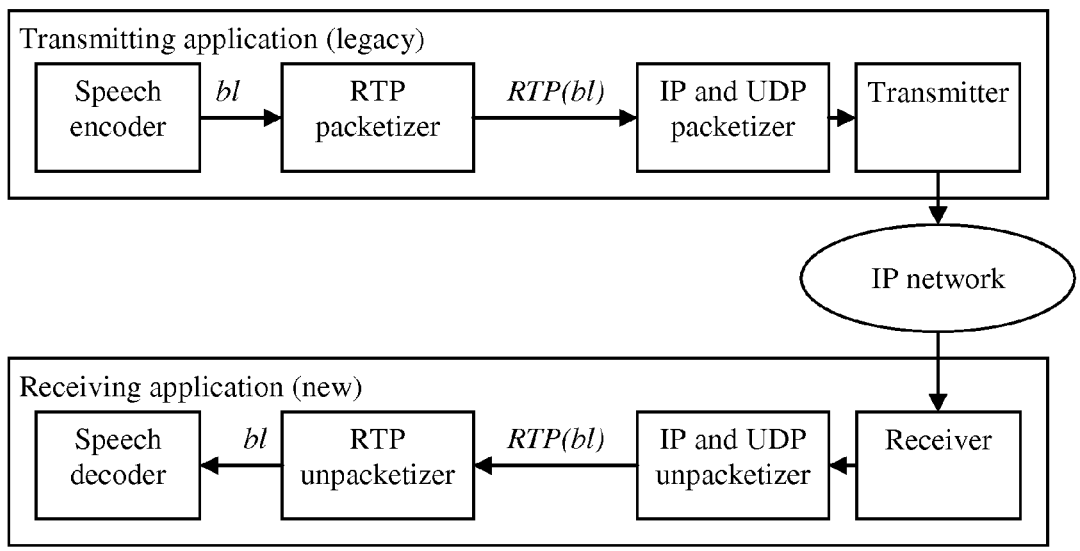
FIG. 19 is a schematic illustration of the function of an embodiment of the present invention.

With reference to FIG. 19, an example of a block diagram of the inter-working between a transmitter containing a legacy encoder and a receiver containing a new decoder is shown. The legacy encoder only generates the base layer which means that the new decoder can only make use of that layer.

It should be understood that the present invention is not limited to only one extension layer, but can be extended to handling multiple extension layers. It is also understood that the present invention is not limited to only two generations of codecs, one legacy codec and one new codec, but can be used to handle more than two generations or types of codecs by use of recursion.

Figure 20:
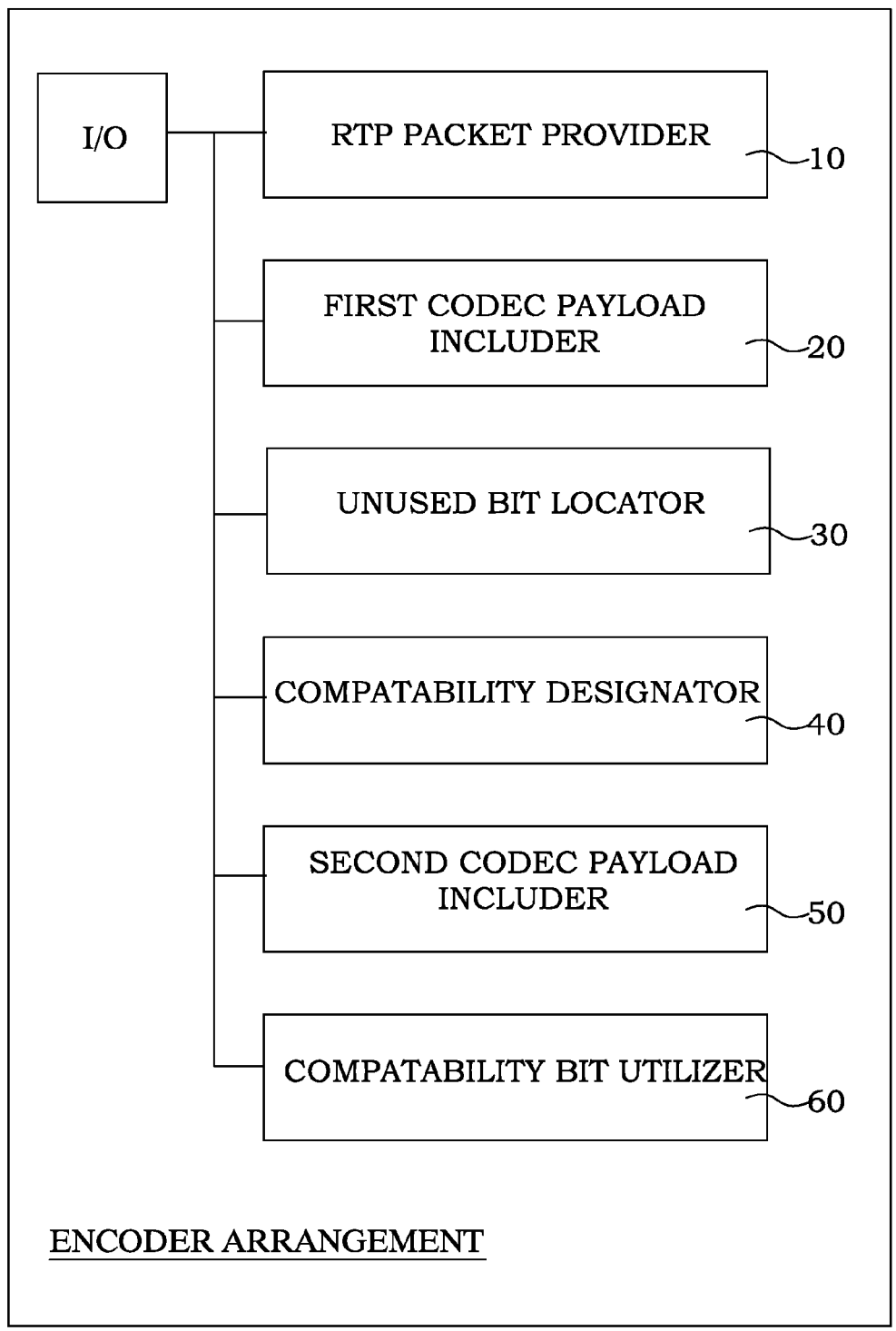
FIG. 20 is a schematic illustration of an encoder arrangement according to an embodiment of the present invention.

With reference to FIG. 20, an embodiment of an encoder according to the present invention will be described. The encoder arrangement for enabling backward and forward compatible speech codecs in a telecommunication system includes a unit for 10 providing a RTP packet, and a unit 20 for including a legacy or first codec payload in the provided RTP packet. The encoder further includes a unit for 30 locating/identifying unused bits in the included legacy or first codec payload, and a unit 40 for 40 designating the located/identified unused bits as codec compatibility bits. Finally, the encoder includes a unit for including 50 a new or second codec payload into the provided RTP package, and a unit for 60 utilizing at least one of the codec compatibility bits to provide an indication of the presence of the new or second codec payload in the provided RTP package.

According to a further embodiment, the unused bit locator is adapted to add unused bits if no unused bits are located in the payload. Correspondingly, the compatibility unit is adapted to designate the added unused bits as the compatibility bits.

Figure 21:
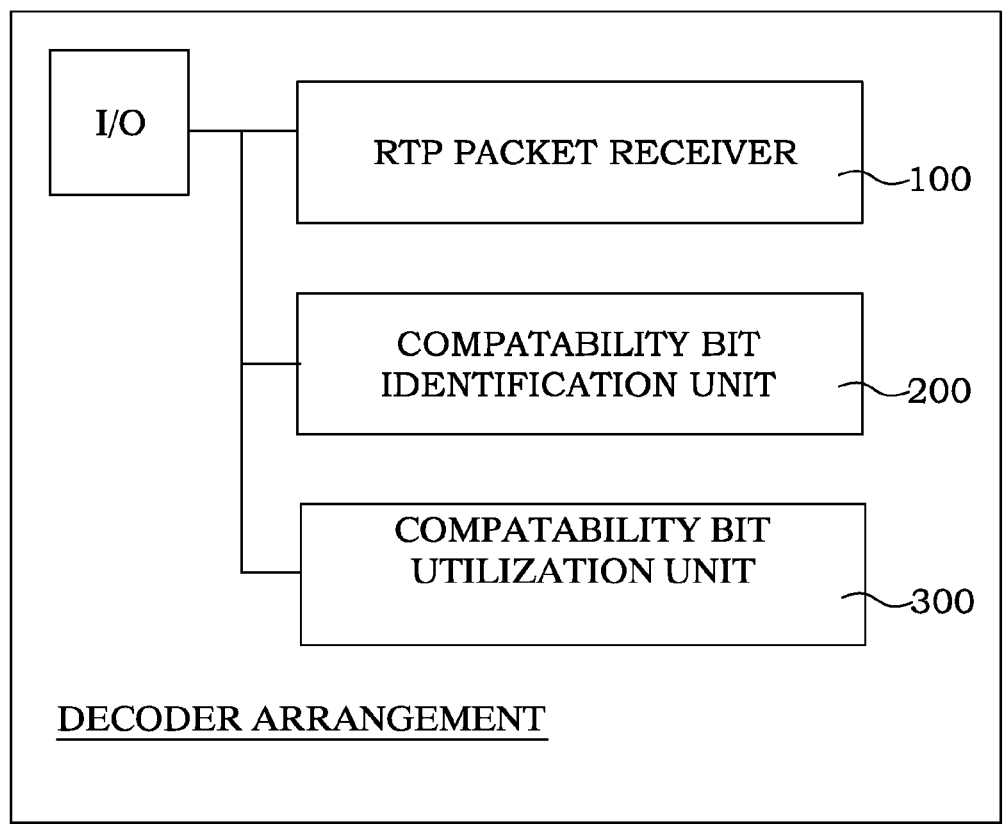
FIG. 21 is a schematic illustration of an of a decoder arrangement according to the present invention.

With reference to FIG. 21, a decoder arrangement in a receiver according to the present invention will be described. The decoder arrangements includes a unit 100 for receiving one or more RTP packets, a unit 200 for identifying or locating at least one compatibility bit in the RTP packet, and a unit 300 for decoding the contents of the RTP packet based on the identified compatibility bit.

The decoder and encoder arrangements of FIG. 20 and FIG. 21 are adapted to enable the execution of the various embodiments of the method according to the present invention. The functionality can be divided amongst different arrangements or contained within one single hardware or software implemented unit. The embodiments of arrangements according to the present invention are preferably implemented as processors or hardware units within or connected to a computer controlled equipment. Consequently, both the decoder and the encoder can be implemented in a same network node.

The backwards compatible payload format gives at least the following advantages:

A legacy decoder/receiver will be able to extract the components of the RTP payload that it understands. For example, an AMR-WB decoder will be able to extract and decode the base layer. Thereby, an RTP packet containing both the base layer and one or more extension layers can be sent to a legacy decoder/receiver with no need for introducing a network node that re-packetize the payload.

The embodiments of the present invention are not limited to only the payload format for AMR and AMR-WB. There are other payload formats that have, for example, ToC entries to identify each frame. Many codecs also leave a few unused bits in the payload. Even if there are no unused bits it is still possible to add extra padding or add the RTP header extension.

Similarly, a new decoder/receiver can be designed to handle only a sub-set of the extension layers. By using several escape bits (or escape sequences) it is possible to create a payload format that allows for adding further extensions in the future. The solution is thus future proof.

A network node can still be used to remove the extension layers if it is known that the receiving client will not use them. In this case, the re-packetization is very simple and has very low complexity.

REFERENCES

[1] 3GPP TS 26.171, Adaptive Multi-Rate—Wideband (AMR-WB) speech codec; General description

[2] 3GPP TS 26.071, AMR speech Codec; General description

[3] RFC 4867, RTP Payload Format and File Storage Format for the Adaptive Multi-Rate (AMR) and Adaptive Multi-Rate Wideband (AMR-WB) Audio Codecs

[4] ITU-T Recommendation G.711, Pulse code modulation (PCM) of voice frequencies

[5] ITU-T Recommendation G.726, 40, 32, 24, 16 kbit/s Adaptive Differential Pulse Code Modulation (ADPCM)

[6] ITU-T Recommendation G.729, Coding of speech at 8 kbit/s using conjugate-structure algebraic-code-excited linear prediction (CS-ACELP)

[7] RFC 3550, RTP: A Transport Protocol for Real-Time Applications

The invention claimed is:

1. A method of generating a backward and forward compatible Real-Time Transport Protocol (RTP) packet, the method comprising:
obtaining or generating an RTP payload comprising a first set of one or more data frames, said first set of data frames comprising a first media frame encoded according to a first codec, wherein said RTP payload further comprises a set of extension bits, wherein, at the time the obtaining or generating step is performed, each bit included in said set of extension bits is used solely for the purpose of extending an element included in the RTP payload so that the element consists of an integer number of octets, wherein the element is one of: a payload header, a table of contents (TOC), a data frame, and a set of data frames; and
after the RTP payload is obtained or generated, further performing the steps of:
modifying the RTP payload by adding to the RTP payload a second set of one or more data frames, said second set of data frames comprising a second media frame encoded according to a second codec that is different from said first codec, wherein after the modifying step is performed the RTP payload comprises both said first media frame and said second media frame, which second media frame is encoded according to the codec that is different than the codec according to which the first media frame is encoded; and
utilizing one or more of said extension bits to provide an indication of the presence of said second set of data frames in the RTP payload.

2. The method according to claim 1, wherein at least one of the one or more extension bits that are utilized to provide the indication of the presence of said second set of data frames in the RTP payload is a reserved bit included in the payload header.

3. The method according to claim 1, wherein
the RTP payload comprises a TOC, and
at least one of the one or more extension bits that are utilized to provide the indication of the presence of said second set of data frames in the RTP payload is a padding bit from a set of one or more padding bits added to the TOC to make the TOC one octet long.

4. The method according to claim 1, wherein
at least one of the one or more extension bits that are utilized to provide the indication of the presence of said second set of data frames in the RTP payload is a bit from a set of padding bits that were added to the RTP payload to ensure that the RTP payload is octet aligned.

5. The method according to claim 1, wherein the RTP payload comprises a payload header and at least one of the one or more extension bits that are utilized to provide the indication of the presence of said second set of data frames in the RTP payload is a bit included in the payload header.

6. The method according to claim 4, further comprising adding said set of padding bits to the end of the RTP payload.

7. The method according to claim 1, wherein
the RTP packet includes an RTP packet header and the RTP payload,
the method further comprises adding a set of one or more padding bits in a header extension between the RTP packet header and the RTP payload.

8. An encoder apparatus for providing a backward and forward compatible speech codec format, the encoder apparatus comprising one or more processors, the encoder apparatus being arranged to:
obtain or generate a Real-Time Transport Protocol (RTP) payload comprising a first set of one or more data frames, said first set of data frames comprising a media frame encoded according to a first codec, wherein said RTP payload further comprises a set of extension bits, wherein, at the time the encoder apparatus obtains or generates the RTP payload, each bit included in said set of extension bits is used solely for the purpose of extending an element included in the RTP payload so that the element consists of an integer number of octets, wherein the element is one of: a payload header, a table of contents (TOC), a data frame, and a set of data frames; and
the encoder apparatus is further configured to:
modify the obtained or generated RTP payload by adding to the RTP payload a second set of one or more data frames, said second set of data frames comprising a media frame encoded according to a second codec that is different from said first codec, wherein the encoder apparatus is configured such that, after the encoder apparatus adds the second set of data frames in the RTP payload, the RTP payload comprises both said first media frame and said second media frame, which second media frame is encoded according to the codec that is different than the codec according to which the first media frame is encoded; and
utilize one or more of said extension bits to provide an indication of the presence of said second set of data frames in the RTP payload.

9. The encoder apparatus according to claim 8, wherein at least one of the one or more extension bits that are utilized to provide the indication of the presence of said second set of data frames in the RTP payload is a bit from a set of padding bits that were added to the RTP payload to ensure that the RTP payload is octet aligned.

10. The encoder apparatus of claim 8, wherein the encoder apparatus is a component of a node in a telecommunication system.

* * * * *